United States Patent
Horiuchi et al.

(10) Patent No.: US 7,940,728 B2
(45) Date of Patent: May 10, 2011

(54) WIRELESS COMMUNICATION APPARATUS AND WIRELESS COMMUNICATION METHOD

(75) Inventors: Ayako Horiuchi, Kanagawa (JP); Kenichi Miyoshi, Kanagawa (JP); Hiroaki Morino, Tokyo (JP)

(73) Assignee: Panasonic Corporation, Osaka (JP)

( * ) Notice: Subject to any disclaimer, the term of this patent is extended or adjusted under 35 U.S.C. 154(b) by 852 days.

(21) Appl. No.: 11/909,922

(22) PCT Filed: Mar. 29, 2006

(86) PCT No.: PCT/JP2006/306530
§ 371 (c)(1),
(2), (4) Date: Sep. 27, 2007

(87) PCT Pub. No.: WO2006/106766
PCT Pub. Date: Oct. 12, 2006

(65) Prior Publication Data
US 2009/0239542 A1    Sep. 24, 2009

(30) Foreign Application Priority Data

Mar. 31, 2005  (JP) .................................. 2005-100851

(51) Int. Cl.
*H04B 7/216* (2006.01)
(52) U.S. Cl. ............ 370/335; 370/336; 455/7; 455/13.1; 455/16
(58) Field of Classification Search .................. 370/315, 370/335, 336; 455/7, 13.1, 16
See application file for complete search history.

(56) References Cited

U.S. PATENT DOCUMENTS

| 5,675,344 | A  | * | 10/1997 | Tong et al. ..................... 342/457 |
| 5,960,040 | A  | * | 9/1999  | Cai et al. ....................... 375/279 |
| 6,473,506 | B1 | * | 10/2002 | Hook et al. .................... 379/279 |
| 2001/0018336 | A1 | | 8/2001 | Okajima et al. |
| 2002/0142732 | A1 | | 10/2002 | Asano |
| 2002/0197969 | A1 | | 12/2002 | Moon |

FOREIGN PATENT DOCUMENTS

| CN | 1394092    | 1/2003  |
| JP | 2001189971 | 7/2001  |
| JP | 2002290246 | 10/2002 |

OTHER PUBLICATIONS

PCT International Search Report dated Jun. 13, 2006.
Chinese Office Action dated Sep. 2, 2010.

* cited by examiner

*Primary Examiner* — Seema S Rao
*Assistant Examiner* — Sai-Ming Chan
(74) *Attorney, Agent, or Firm* — Dickinson Wright PLLC

(57) ABSTRACT

A wireless communication method capable of preventing reduction of the throughput. According to this wireless communication method, in a frame (2), a relay station (1) decides that the amount of delay to be Δt2 because the modulation scheme of a relayed signal is 16 QAM, while another relay station (2) decides that the delay amount be Δt4 because the modulation scheme of a relayed signal is QPSK. The relay station (1) transmits, at Δt2 of the frame (2), the relayed signal, the modulation scheme of which is 16 QAM, to a base station. On the other hand, the relay station (2) detects, by Δt4, the fact that the relay station (1) transmitted the relayed signal at Δt2, and estimates, from the detected fact, that the modulation scheme used by the relay station (1) was 16 QAM. The relay station (2) then updates its modulation scheme from the initially established modulation scheme of QPSK to the same modulation scheme of 16 QAM as the relay station (1), and modulates the relayed signal by use of 16 QAM and then transmits it to the base station.

12 Claims, 8 Drawing Sheets

| MODULATION SCHEME | BPSK | QPSK | 8PSK | 16QAM | 64QAM |
|---|---|---|---|---|---|
| AMOUNT OF DELAY | $\Delta t1$ | $\Delta t2$ | $\Delta t3$ | $\Delta t4$ | $\Delta t5$ |

| M-ARY MODULATION LEVEL | DECREASE | INCREASE | NO CHANGE |
|---|---|---|---|
| AMOUNT OF DELAY | $\Delta t1$ | $\Delta t2$ | $\Delta t3$ |

WIRELESS COMMUNICATION APPARATUS AND WIRELESS COMMUNICATION METHOD

TECHNICAL FIELD

The present invention relates to a wireless communication apparatus and a wireless communication method.

BACKGROUND ART

In recent years, with the multimediatization of information in cellular mobile communication systems as represented by cell phones and so on, it is becoming popular to transmit not only audio data, but also great amounts of data such as still pictures, moving pictures and so on. To realize the transmission of such great amounts of data, a technology in which a high-frequency wireless band is used to obtain a high-transmission rate is being actively studied.

When high frequency radio bands are utilized, a high transmission rate can be expected in a short distance, but attenuation due to a transmission distance is significant. Therefore, when high frequency radio bands are utilized in a real system, for example, the coverage area of a base station becomes small, and it is necessary to provide more base stations. Providing base stations require significant costs, and therefore it is strongly desired to suppress an increase in the number of base stations and provide the above communication services.

To address these demands, a technology is investigated in which, a mobile station is used as a relay station, and a communication network is formed directly between a base station and a mobile station, while another communication network (ad-hoc network) is formed via the relay station, and the reception signals of both communication networks are combined at the base station to obtain diversity gain (see, for example, Patent Document 1).

Patent Document 1: Japanese Patent Application Laid-Open No. 2001-189971

DISCLOSURE OF INVENTION

Problems to be Solved by the Invention

However, the technique described in the above-mentioned Patent Document 1 requires that the mobile stations form an ad-hoc network use the same MCS (Modulating Scheme and Coding Scheme (coding rate)) to carry out relay transmission between the relay stations. To synchronize the MCS between relay stations, it is necessary to specify the MCS to each relay station by signaling or have relay stations signaling each other to report the MCS, and, in either case, the amount of signaling increases and throughput decreases.

It is therefore an object of the present invention to provide a wireless communication apparatus and wireless communication method capable of preventing a decrease in throughput.

Means for Solving the Problem

The mobile wireless communication apparatus of the present invention relays and transmits a relay signal, generated by demodulating a transmission signal from a first wireless communication apparatus and modulating the demodulated signal again, to a second wireless communication apparatus, and this wireless communication apparatus employs a configuration including: an estimating section that estimates a modulation scheme at another wireless communication apparatus that relays and transmits the transmission signal to the second wireless communication apparatus, from an amount of delay for relay transmission at the another wireless communication apparatus; a modulation section that modulates the relay signal using the estimated modulation scheme; and a transmitting section that transmits the modulated relay signal to the second wireless communication apparatus.

Advantageous Effects of the Invention

According to the present invention, it is possible to prevent a decrease in throughput.

BEST MODE FOR CARRYING OUT THE INVENTION

Next, embodiments of the present invention will be described in detail with reference to the accompanying drawings. The wireless communication apparatus that will be described below is adapted to demodulate a transmission signal from a first wireless communication apparatus, modulate the demodulated signal again to obtain a relay signal, and relay and transmit this relay signal to a second wireless communication apparatus, and is mounted, for instance, in a wireless communication relay station apparatus (hereinafter simply "relay station") to be used in a mobile communication system. In the following embodiments, the wireless communication apparatus that performs relay-transmission is described as a relay station, the first wireless communication apparatus as a wireless communication mobile station apparatus (hereinafter simply "mobile station"), and the second wireless communication apparatus as a wireless communication base station apparatus (hereinafter simply "base station").

Figure 1:
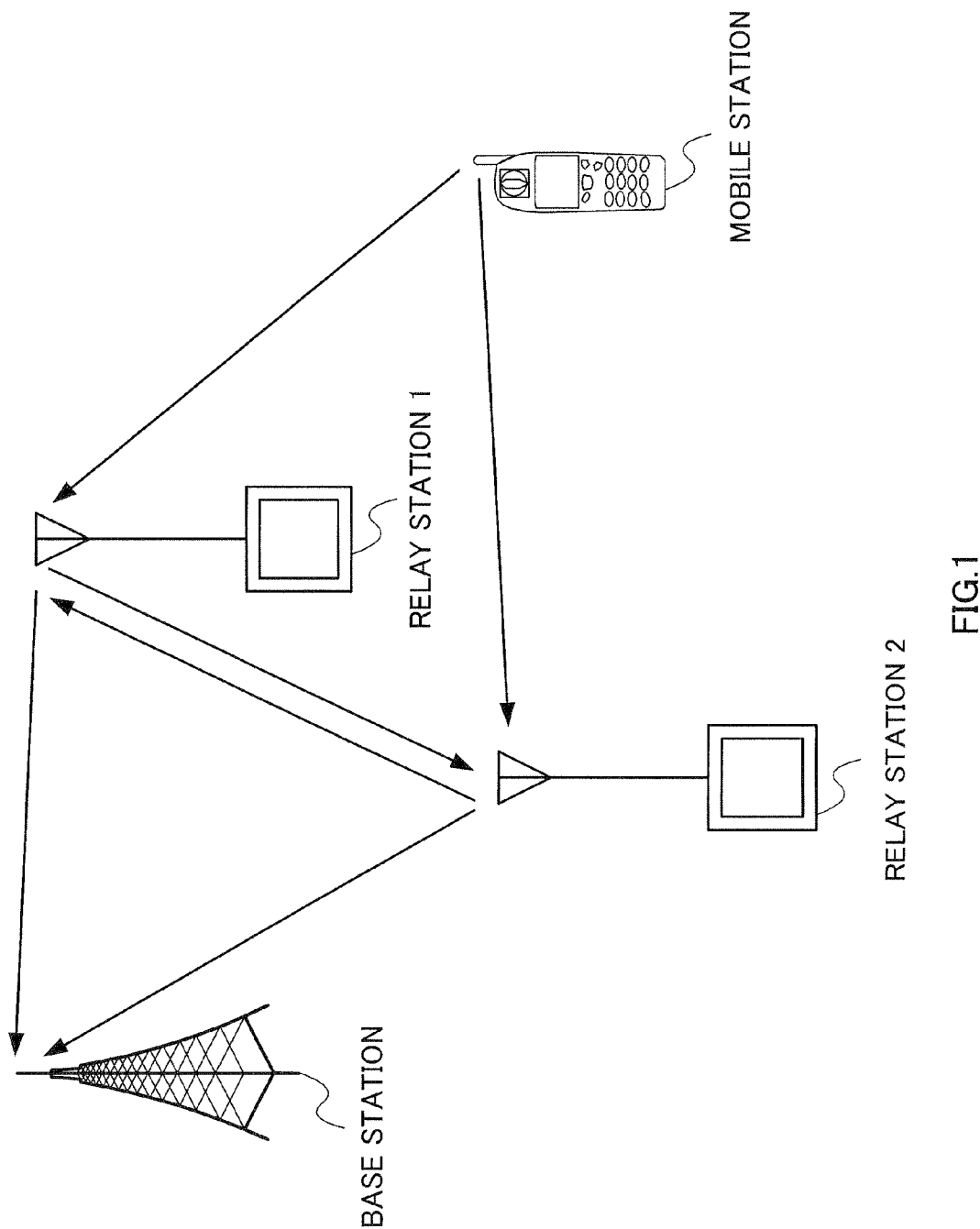
FIG. 1 is a configuration diagram of a mobile communication system according to embodiments.

The mobile communication system according to the following embodiments comprises, as shown in FIG. 1, a plurality of relay stations (relay stations 1 and 2) which relay and transmit a transmission signal from a mobile station to a base station. At this time, relay station 1 and relay station 2 perform relay-transmission using the same MCS. Also, the mobile station, relay station and base station perform reception and transmission in synchronization with each other per unit of a frame having a predetermined time period.

In this mobile communication system, relay station 1 and relay station 2 delay a signal received from the mobile station and transmit this signal to the base station, in a relay process.

This delay control will be described in detail with each embodiment. Also, the base station receives both the signal relayed by relay station 1 and the signal relayed by relay station 2, and combines these signals. The signal transmitted from relay station 1 arrives at relay station 2, and, similarly, the signal transmitted from relay station 2 arrives at relay station 1. Accordingly, it is possible to detect at relay station 1 whether relay station 2 has transmitted a relay signal, and, similarly, it is possible to detect at relay station 2 whether relay station 1 has transmitted a relay signal.

The relay stations according to the following embodiments may be provided in advance, or other mobile stations may be used as relay stations, as in an ad-hoc network (see above Patent Document 1, for instance).

Embodiment 1

In the present embodiment, each relay station decides the amount of delay for the relay signal in accordance with the MCS parameter for relay-transmission. Then, if a relay station detects, during a delay period of the relay signal, that another relay station has transmitted the same relay signal to the base station, the relay station estimates the MCS parameter of another relay station from the amount of delay at another relay station, and performs relay-transmission using the same MCS parameter as the MCS parameter at another relay station. In other words, if a relay station detects that another relay station has performed relay-transmission to the base station earlier than the relay station, the relay station adjusts its modulation scheme for the relay signal to the modulation scheme of the relay signal at another relay station.

With respect to the MCS parameter used to decide the amount of delay, the base station measures channel quality between the relay station and the base station, and reports an MCS parameter suitable for this channel quality, to the relay station. Here, the received quality of the signal transmitted from the relay station, at the base station, is employed as channel quality, for instance. If the mobile communication system according to the present embodiment is a TDD (Time Division Duplex) scheme communication system, the correlation between the uplink channel characteristic and the downlink channel characteristic is extremely high, so that each relay station is able to estimate the received quality measured at the base station from the received quality of the signal from the base station. Thus, in case of a TDD-scheme communication system, the relay station may measure the received quality of the signal from the base station and employ the MCS parameter in accordance with this received quality.

Also, the MCS parameter which is set in accordance with the channel quality, may be set to an MCS parameter at which the relay signal from one of the relay stations satisfies the desired quality at the base station, or, taking into account that relay signals are transmitted from a plurality of relay stations, may be set to an MCS parameter at which the MCS level is higher (i.e. the M-ary modulation level is greater) than that of the MCS parameter at which the relay signal from one of the relay stations satisfies the desired quality at the base station.

Figures 2, 3:
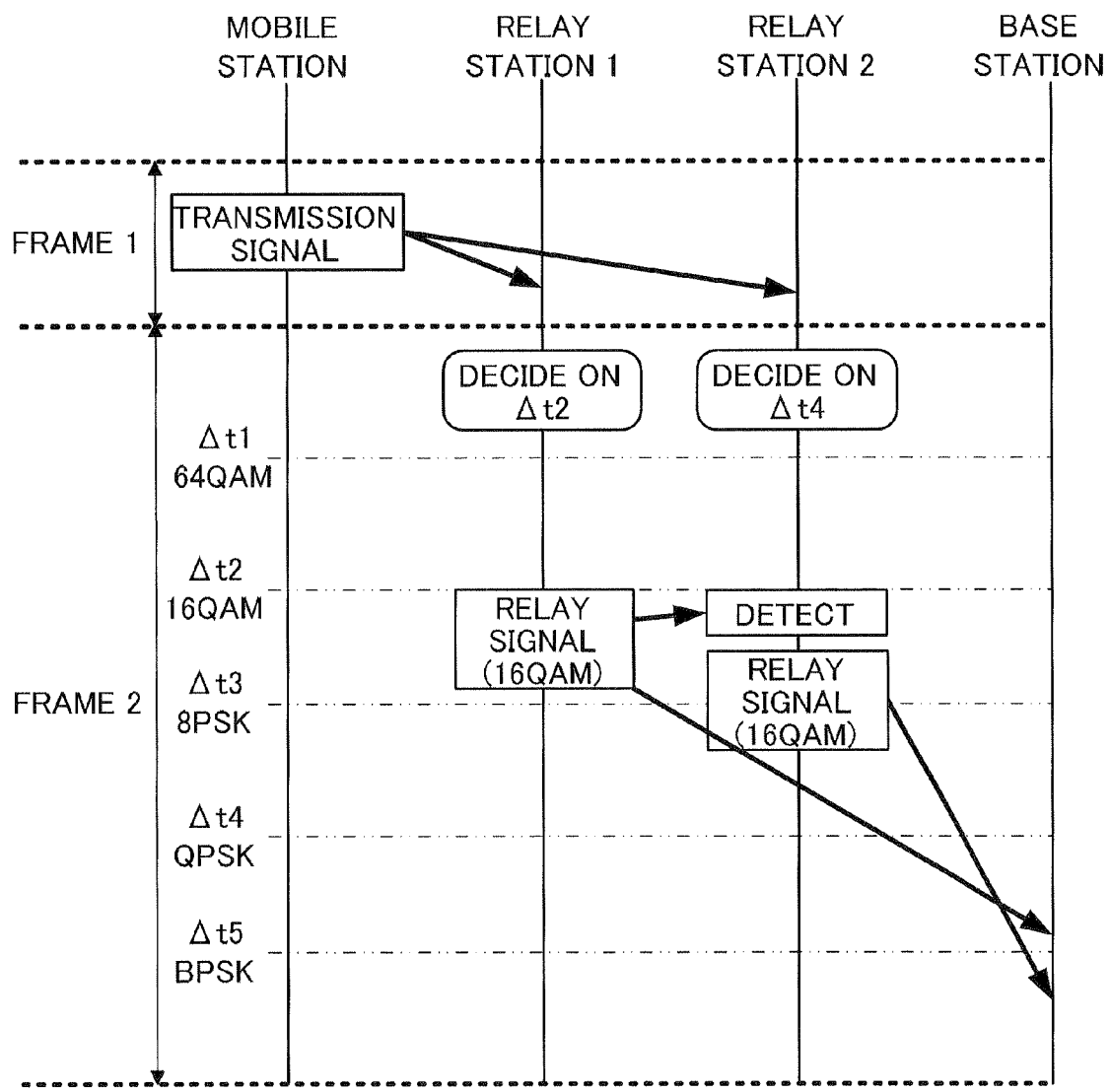
FIG. 2 is a look-up table according to embodiment 1.
FIG. 3 is a sequence diagram according to embodiment 1.
Figures 4, 5:
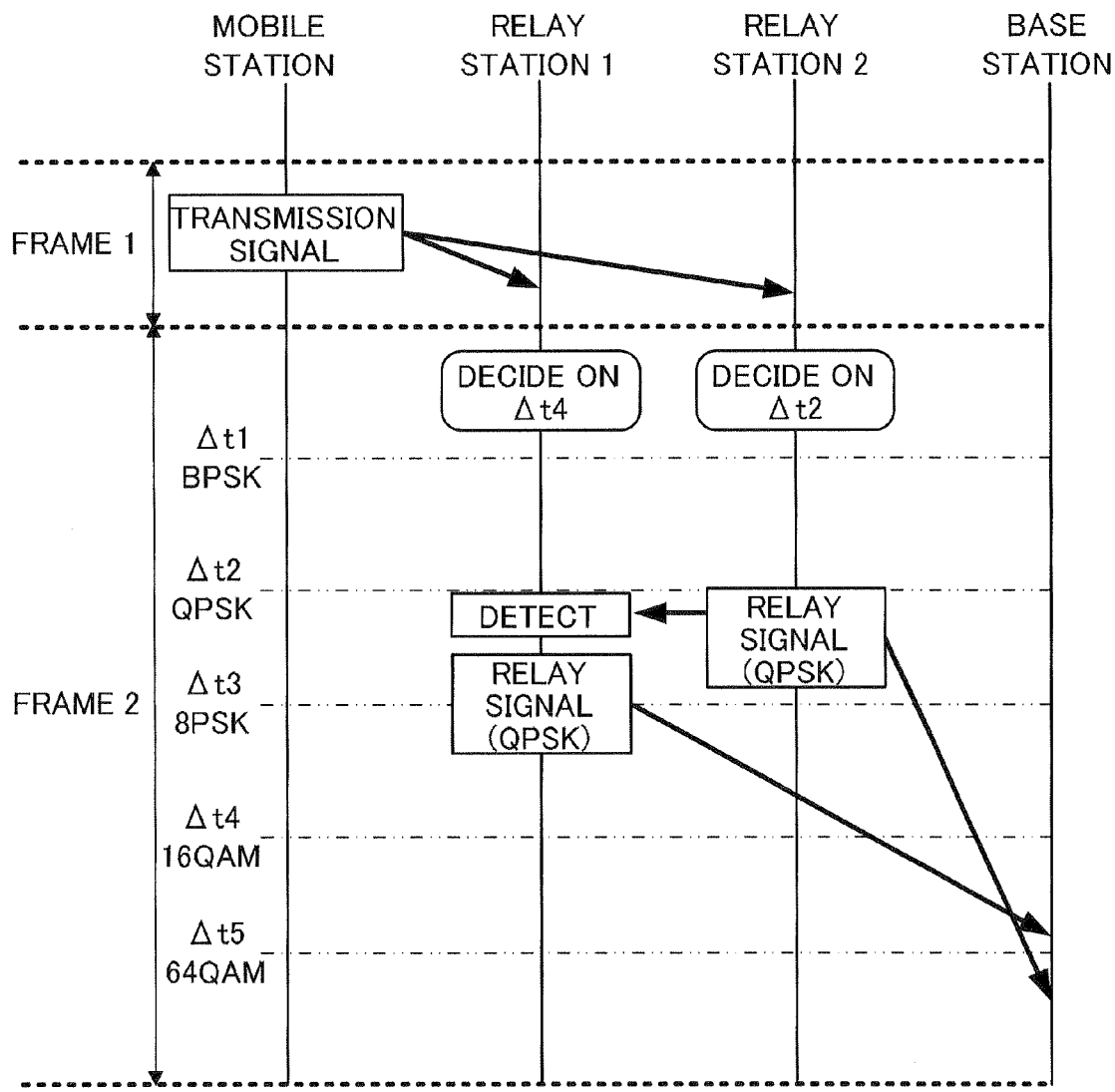
FIG. 4 is a look-up table according to embodiment 1.
FIG. 5 is a sequence diagram according to embodiment 1.

First, the operation of the mobile communication system according to the present embodiment will be described. In the present embodiment, the decision on the amount of delay and the estimation on the MCS parameter at a relay station are made using <table example 1> in the table shown in FIG. 2 or <table example 2> in the table shown in FIG. 4, as will be described in the following text. In each table, the amounts of delay are provided such that $\Delta t1<\Delta t2<\Delta t3<\Delta t4<\Delta t5$. Also, relay station 1 and relay station 2 are provided with the same table as shown in FIG. 2 or FIG. 4. Relay station 1 and relay station 2 at the same time receive the same signal from the mobile station.

Table Example 1

In table example 1 (FIG. 2), modulation schemes with greater M-ary modulation levels are set for smaller amounts of delay, and modulation schemes for smaller M-ary modulation levels are set for greater amounts of delays.

Each relay station decides the amount of delay in accordance with the MCS parameter that is set based on the channel quality between the relay station and the base station. To be more specific, the relay station decides that, when the modulation scheme of that MCS parameter is 64 QAM, the amount of delay for the relay signal is $\Delta t1$. The amounts of delay ($\Delta t2$, $\Delta t3$, $\Delta t4$ and $\Delta t5$) for the other modulation schemes (16 QAM, 8 PSK, QPSK and BPSK) are decided in the same manner. In other words, each relay station decreases the amount of delay for a modulation scheme of a greater M-ary modulation level (i.e. greater MCS level) and increases the amount of delay for a modulation scheme of a smaller M-ary modulation level (i.e. lower MCS level). Then, the relay station delays the signal received from the mobile station by the decided amount of delay.

Also, each relay station determines whether another relay station transmitted the relay signal with a smaller amount of delay than the amount of delay at that relay station. If the relay station detects that another relay station relayed and transmitted the same relay signal to the base station, by the delay period at the relay station, it estimates the MCS parameter employed by another relay station for the relay signal, from the amount of delay that another relay station imposed on the relay signal. For instance, if one relay station detects that another relay station has performed relay-transmission with amount of delay $\Delta t2$, the relay station estimates that the MCS parameter for relay-transmission at that another relay station is 16 QAM. Then, the relay station modulates the relay signal using the estimated MCS parameter and transmits the resulting signal. As a result, if another relay station has performed relay-transmission earlier than the relay station, the relay station adjusts the modulation scheme of the relay signal at the relay station, to the modulation scheme of the relay signal at that another relay station, thereby performing relay-transmission using the same modulation scheme.

On one hand, if the relay station does not detect that another relay station has performed relay-transmission to the base station during the delay period at the relay station, the relay station modulates the relay signal using the MCS parameter set in accordance with the channel quality between the relay station and the base station, and transmits the resulting relay signal with a suitable amount of delay for this MCS parameter.

In this way, each relay station estimates the MCS parameter at another relay station from the amount of delay of the relay-transmission at another relay station and performs relay-transmission using the same MCS parameter as the estimated MCS parameter, so that it is no longer necessary to specify the MCS to the relay station by signaling from the base station or the mobile station and report the MCS by performing signaling between the relay stations, to assure that the same MCS is used between the relay stations, and, consequently, it is possible to avoid a decrease in throughput even when a plurality of relay stations must perform relay-transmission using the same MCS parameter.

Next, FIG. 3 shows a sequence diagram illustrating a case where the modulation scheme (i.e. MCS parameter) set at relay station 1 is 16 QAM, and the modulation scheme (i.e. MCS parameter) set at relay station 2 is QPSK, in table example 1, in other words, a case where the M-ary modulation level of relay station 1 is greater than the M-ary modulation level of relay station 2 (i.e. a case where the MCS level of relay station 1 is higher than the MCS level of station 2). Here, it is assumed that the frame timing the relay signal is received or transmitted is decided by the base station, mobile station, or a higher control station, and is reported in advance to the relay station.

In frame 1, the mobile station transmits the transmission signal for the base station, to relay station 1 and relay station 2.

In frame 2, since the modulation scheme of the relay signal is 16 QAM, base station 1 decides the amount of delay to be $\Delta t2$, with reference to the table in FIG. 2. Also, since the modulation scheme of the relay signal is QPSK, relay station 2 decides the amount of delay to be $\Delta t4$, with reference to the table of FIG. 2. Then, relay station 1 transmits the relay signal whose modulation scheme is 16 QAM, to the base station, with amount of delay $\Delta t2$ of frame 2. On the other hand, relay station 2 detects, during amount of delay $\Delta t4$, whether relay station 1 transmitted the relay signal with amount of delay $\Delta t2$. If the detection result is affirmative, relay station 2 estimates, from the fact that the relay signal from relay station 1 is transmitted with amount of delay $\Delta t2$, that the modulation scheme used by relay station 1 is 16 QAM, with reference to the table in FIG. 2. Then, relay station 2 updates QPSK which is modulation scheme initially set, to 16 QAM which is the same modulation scheme as that of relay station 1, then modulates the relay signal using 16 QAM and transmits the modulated signal to the base station. Also, as soon as a relay signal from relay station 1 is detected, relay station 2 cancels the delay at relay station 2 and immediately transmits the relay signal. Thus, the relay signal from relay station 2 is transmitted at an earlier timing than the amount of delay $\Delta t4$ which was initially decided. Then, the base station receives the relay signal from relay station 1 and the relay signal from relay station 2 and combines both relay signals.

In this way, in table example 1, the modulation scheme of a relay station is adjusted to the modulation scheme of a relay station having higher channel quality (i.e., greater M-ary modulation level), so that the transmission rate of the relay signal can be increased.

Table Example 2

Table example 2 (FIG. 4) differs from table example 1 (FIG. 2) in setting modulation schemes of greater M-ary modulation levels with respect to greater amounts of delay and modulation schemes of smaller M-ary modulation levels with respect to smaller amounts of delay. In other words, each relay station decreases the amount of delay for a modulation scheme of a smaller M-ary modulation level (i.e. lower MCS level) and increases the amount of delay for a modulation scheme of a greater M-ary modulation level (i.e. higher MCS level).

The use of such a table makes it possible to adjust the modulation scheme of a relay station to the modulation scheme at a relay station where the channel quality is lower (i.e., lower M-ary modulation level), relay signals from a plurality of relay stations can be reliably received at the base station.

Next, FIG. 5 shows a sequence diagram illustrating a case where the modulation scheme (i.e., MCS parameter) set at relay station 1 is 16 QAM, and the modulation scheme (i.e., MCS parameter) set at relay station 2 is QPSK, in table example 2, in other words, a case where the M-ary modulation level of relay station 2 is smaller than the M-ary modulation level of relay station 1 (that is, the MCS level of relay station 2 is lower than the MCS level of relay station 1).

In frame 1, the mobile station transmits the transmission signal for the base station, to relay station 1 and relay station 2.

In frame 2, since the modulation scheme of the relay signal is 16 QAM, relay station 1 decides the amount of delay to be $\Delta t4$, with reference to the table in FIG. 4. Also, since the modulation scheme of the relay signal is QPSK, relay station 2 decides the amount of delay to be $\Delta t2$, with reference to the table of FIG. 4. Then, relay station 2 transmits the relay signal whose modulation scheme is QPSK, to the base station, with amount of delay $\Delta t2$ of frame 2. On the other hand, relay station 1 detects, by $\Delta t4$, whether relay station 2 transmitted the relay signal with amount of delay $\Delta t2$. If the detection result is affirmative, relay station 1 estimates, from the fact that the relay signal from relay station 2 is transmitted with amount of delay $\Delta t2$, that the modulation method used by relay station 2 is QPSK, with reference to the table of FIG. 4. Then, relay station 1 updates 16 QAM, which is the modulation scheme initially set, to QPSK, which is the same modulation scheme as that of relay station 2, then modulates the relay signal using QPSK and transmits the modulated signal to the base station. Also, as soon as a relay signal from relay station 2 is detected, relay station 1 cancels the delay at relay station 1, and immediately transmits the relay signal. Thus, the relay signal from relay station 1 is transmitted at an earlier timing than the amount of delay $\Delta t4$ which was initially decided. Then, the base station receives the relay signal from relay station 1 and the relay signal from relay station 2 and combines both relay signals.

In this way, while relay-transmission is carried out, in table example 1, by employing a modulation scheme of a greater M-ary modulation level, in table example 2, relay-transmission is carried out using a modulation scheme of a smaller M-ary modulation level, and, consequently, relay signals from a plurality of base stations can be reliably received at the base station.

Figure 6:
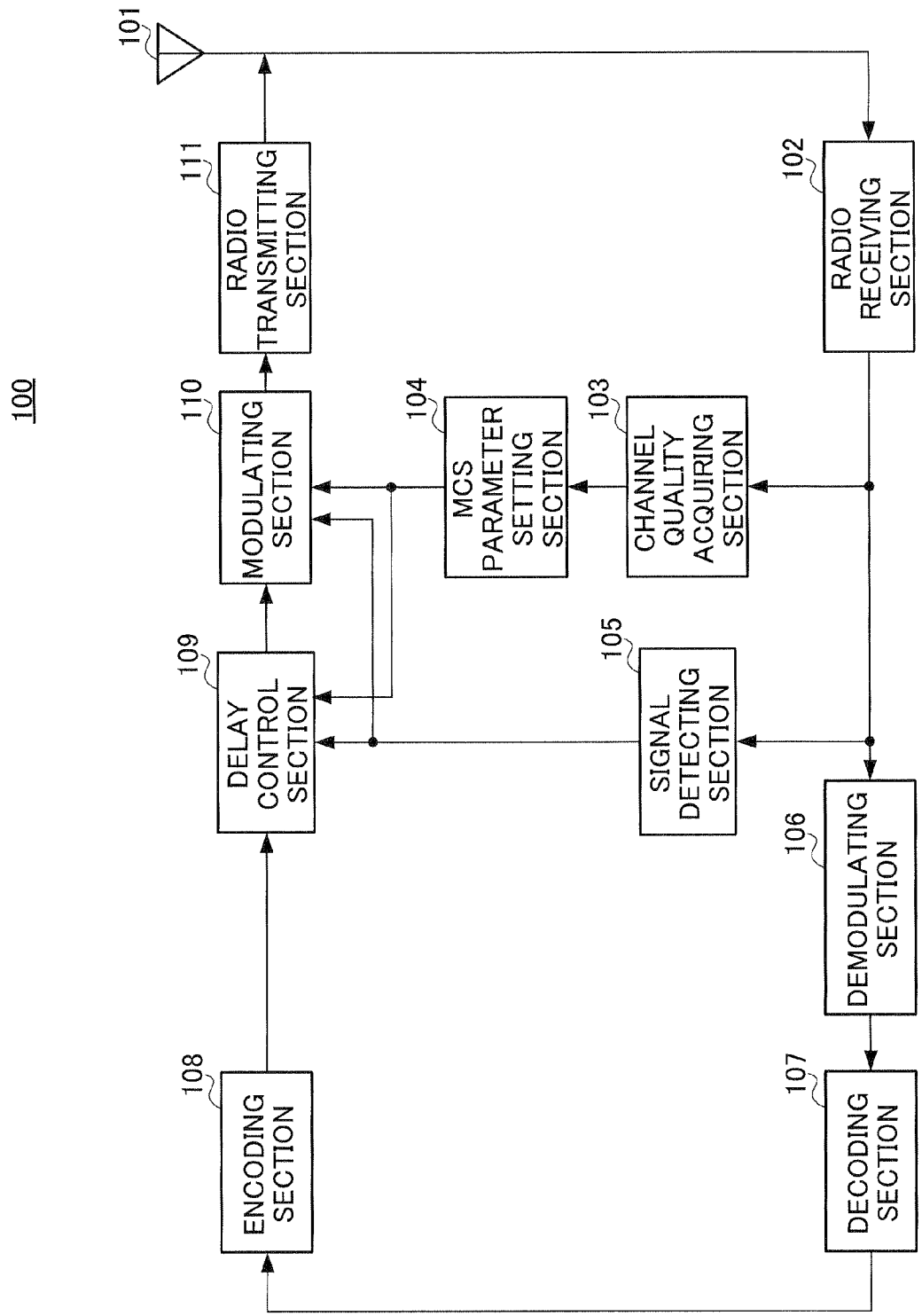
FIG. 6 is a block diagram showing a configuration of a relay station according to embodiment 1.

Next, the configuration of the relay station according to the present embodiment will be described. The configuration of relay station 100 according to the present embodiment is shown in FIG. 6. The above-mentioned relay station 1 and relay station 2 have the same configuration. The following description will be limited to uplink relay transmission alone and yet downlink relay-transmission can be carried out in the same way as uplink relay transmission.

In relay station 100, radio receiving section 102 receives the signal from the mobile station, the channel quality information from the base station and the relay signal transmitted by the other relay station, via antenna 101, performs radio processing such as down-conversion on the like, on these signals, and outputs the result.

Channel quality acquiring section 103 acquires the channel quality between relay station 100 and the base station, from the channel quality information from the base station. In the case of a TDD scheme communication system, channel quality acquiring section 103 measures the received quality of the signal from the base station to acquire the channel quality. The acquired channel quality is inputted to MCS parameter setting section 104.

MCS parameter setting section 104 decides the MCS parameter of the relay signal in accordance with the channel quality, and sets this parameter in delay control section 109 and modulating section 110.

Signal detecting section 105 compares the signal from the mobile station to the relay signal from the other relay station to determine whether the other relay station has already performed relay-transmission. In other words, if the signal from the mobile station is the same as the relay signal from the other relay station, signal detecting section 105 determines that the same relay signal has already been transmitted from the other relay station to the base station, and detects whether the other relay station has already performed relay-transmission. If the detection result is affirmative, this information is inputted to delay control section 109 and modulating section 110.

Also, if signal detecting section 105 detects that the other relay station has already performed relay-transmission, signal detecting section 105 estimates the amount of delay for the relay-transmission at the other relay station. If the signal from the mobile station is the same as the relay signal from the other relay station, signal detecting section 105 estimates the difference between the timing the signal from the mobile station is inputted (i.e., the reception timing of the signal from the mobile station, at relay station 100) and the timing the relay signal from the other relay station is inputted (i.e., the reception timing of the relay signal from the other relay station, at relay station 100), as the amount of delay at the other relay station. In other words, signal detecting section 105 estimates the input delay difference (reception delay difference) of the relay signal from the other relay station, with respect to the signal from the mobile station, as the amount of delay at the other relay station. Also, signal detecting section 105 is provided with the table shown in FIG. 2 or FIG. 4, and estimates the MCS parameter used by the other relay station from the estimated amount of delay, with reference to this table. Then, signal detecting section 105 inputs the estimation result of the MCS parameter to modulating section 110.

The signal from the mobile station which is outputted from radio receiving section 102 is demodulated by demodulating section 106, and, after being decoded at decoding section 107, the signal is encoded again at encoding section 108, and the result is inputted to delay control section 109.

Delay control section 109 is provided with the table shown in FIG. 2 or FIG. 4, and decides the amount of delay in accordance with the MCS parameter set at MCS parameter setting section 104, with reference to this table.

Then, if signal detecting section 105 does not detect, during a period of time from the head of the frame of the relay signal until the delay period has passed, that the other relay station has performed relay-transmission to the base station, delay control section 109 delays the relay signal by the decided amount of delay, and outputs the delayed relay signal to modulating section 110.

On the other hand, if signal detecting section 105 detects, during a period of time from the head of the frame of the relay signal until the delay period has passed, that the other relay station has performed relay-transmission to the base station, delay control section 109 cancels the delay process at the timing reporting of the above detection is inputted from signal detecting section 105, and immediately outputs the relay signal to modulating section 110. Thus, in this case, delay control section 109 outputs the relay signal to modulating section 110 at an earlier timing than the delay period initially decided.

If signal detecting section 105 does not detect that the other relay station has performed relay-transmission to the base station, modulating section 110 modulates the relay signal using the modulation scheme of the MCS parameter that is set by MCS parameter setting section 104, and outputs the result to radio transmitting section 111.

On the other hand, if signal detecting section 105 detects that the other relay station has performed relay-transmission to the base station, modulating section 110 updates the MCS parameter set by MCS parameter setting section 104, by the MCS parameter estimated at signal detecting section 105, modulates the relay signal using the modulation scheme whose MCS parameter is updated, and outputs the result to radio transmitting section 111.

Then, radio transmitting section 111 performs radio processing such as up-conversion and so on, on the relay signal, and transmits the resulting relay signal from antenna 101 to the base station.

In this way, if relay station 100 detects that another relay station has performed relay-transmission to the base station earlier than relay station 100, relay station 100 adjusts the modulation scheme of the relay signal at relay station 100 to the modulation scheme of the relay signal at that another relay station, and transmits the relay signal.

Figure 7:
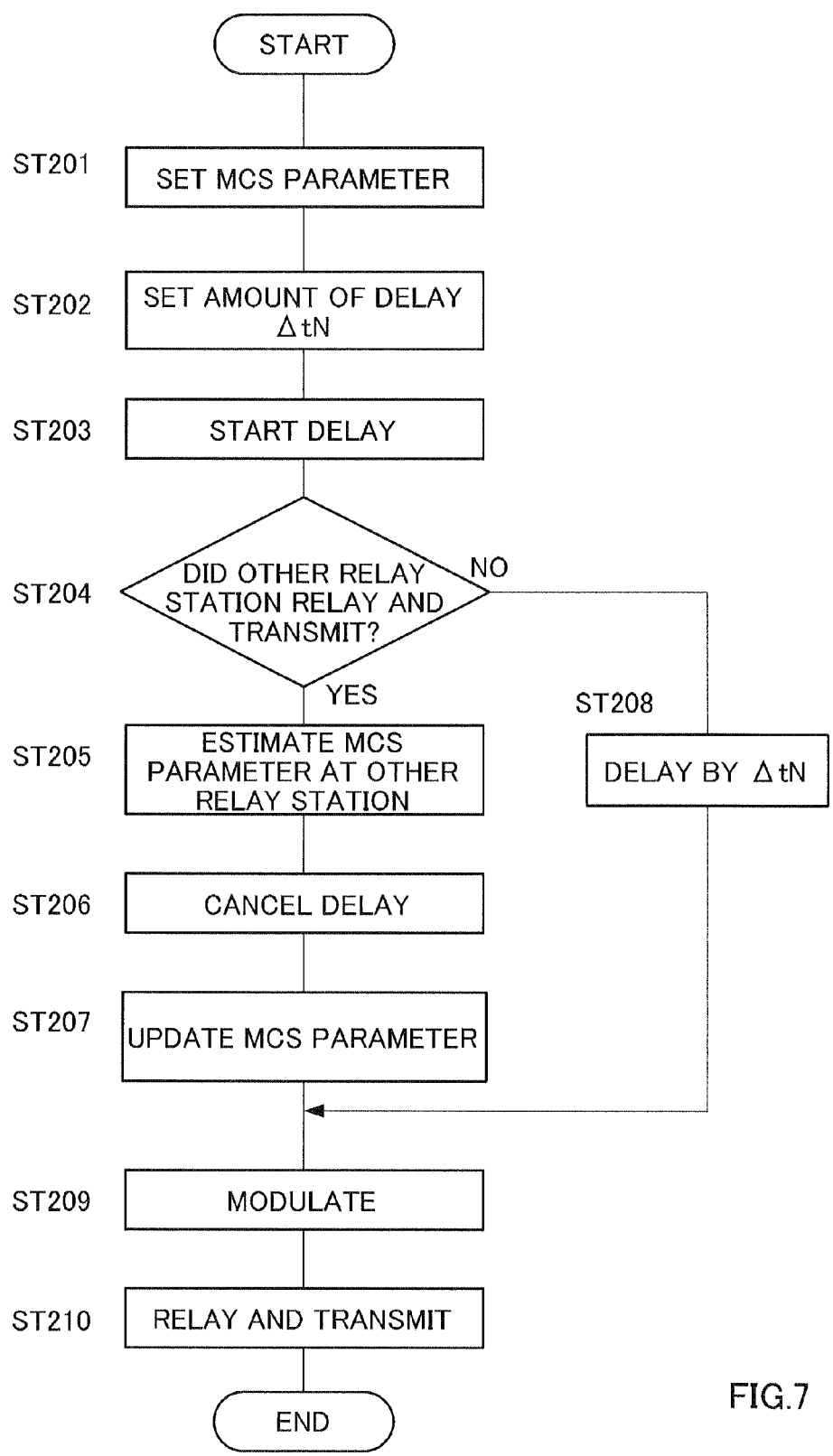
FIG. 7 is an operation flow diagram of the relay station according to embodiment 1.

Next, the operation flow for the delay process and the modulation process at relay station 100 will be described using the flow chart of FIG. 7.

In ST (step) 201, the MCS parameter is set in accordance with channel quality.

In ST202, a amount of delay ΔtN in accordance with the MCS parameter set in ST201 is decided based on the table shown in FIG. 2 or FIG. 4.

In ST203, the delay process by the amount of delay ΔtN decided in ST202 is started.

In ST204, it is determined whether the other relay station has performed relay-transmission.

If it is determined that the other relay station has carried out relay-transmission in ST204 ("YES" in ST204), the MCS parameter of the other relay station is estimated in ST205, the delay process is cancelled, in ST206, even before the amount of delay ΔtN has passed, and in ST207, the MCS parameter set in ST201 is updated by the MCS parameter estimated in ST205.

On the other hand, if it is determined that the other relay station did not carry out relay-transmission in ST204 ("NO" in ST204), the delay process by amount of delay ΔtN is carried out in ST208.

Then, in ST209, the relay signal is modulated using the modulation scheme whose MCS parameter is updated in ST207 ("YES" in ST204), or the modulation scheme whose MCS parameter is set in ST201 ("NO" in ST204), and in ST210, the modulated relay signal is relayed and transmitted to the base station.

Thus, in the present embodiment, since the relay station estimates the MCS parameter of another relay station based on the amount of delay for the relay signal, reporting of the MCS parameter from the base station or the mobile station to the relay station and reporting of the MCS parameter between the relay stations become unnecessary even when the relay stations need to transmit the relay signal to the base station using the same MCS parameter, thereby making it possible to reduce the amount of signaling necessitated by relay-transmission and improve throughput.

Embodiment 2

The present embodiment differs from embodiment 1 in employing a table that sets an increase or decrease of M-ary modulation levels in association with a plurality of amounts of delay. The following description will be focused on the differences between the present embodiment and embodiment 1.

In the present embodiment, the relay station decides the amount of delay in accordance with the difference between the previously set MCS parameter and the presently set MCS parameter. In other words, the relay station decides the amount of delay of the delay signal in accordance with the increase or decrease of the M-ary modulation level of the modulation scheme used at present, with respect to the M-ary modulation level of the modulation scheme used previously.

Although, for ease of explanation, a case will be described here in the following description where each relay station changes the M-ary modulation level by one level from the modulation scheme used earlier, each relay station is equally able to increase the levels of the amount of delay and change the M-ary modulation level by two levels or more.

In an initial state, it is assumed that the MCS parameter is the same at all relay stations. The initial state of the MCS parameter is set in accordance with an average value of channel quality between a plurality of relay stations, or the number of relay stations that carry out relay, for instance, and reset to the initial state is made, for instance, when communication of a mobile communication is started.

Figures 8, 9:
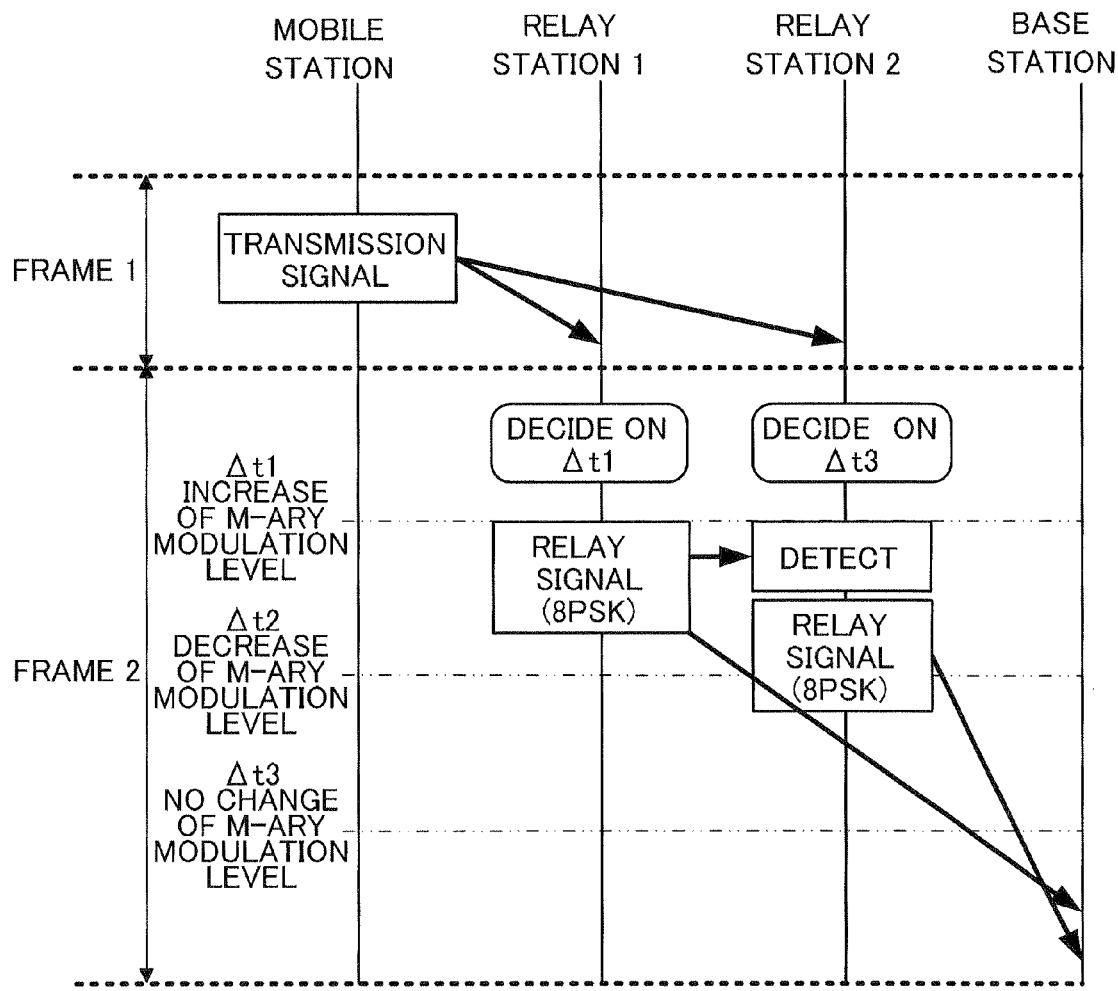
FIG. 8 is a look-up table according to embodiment 2.
FIG. 9 is a sequence diagram according to embodiment 2.
Figures 10, 11:
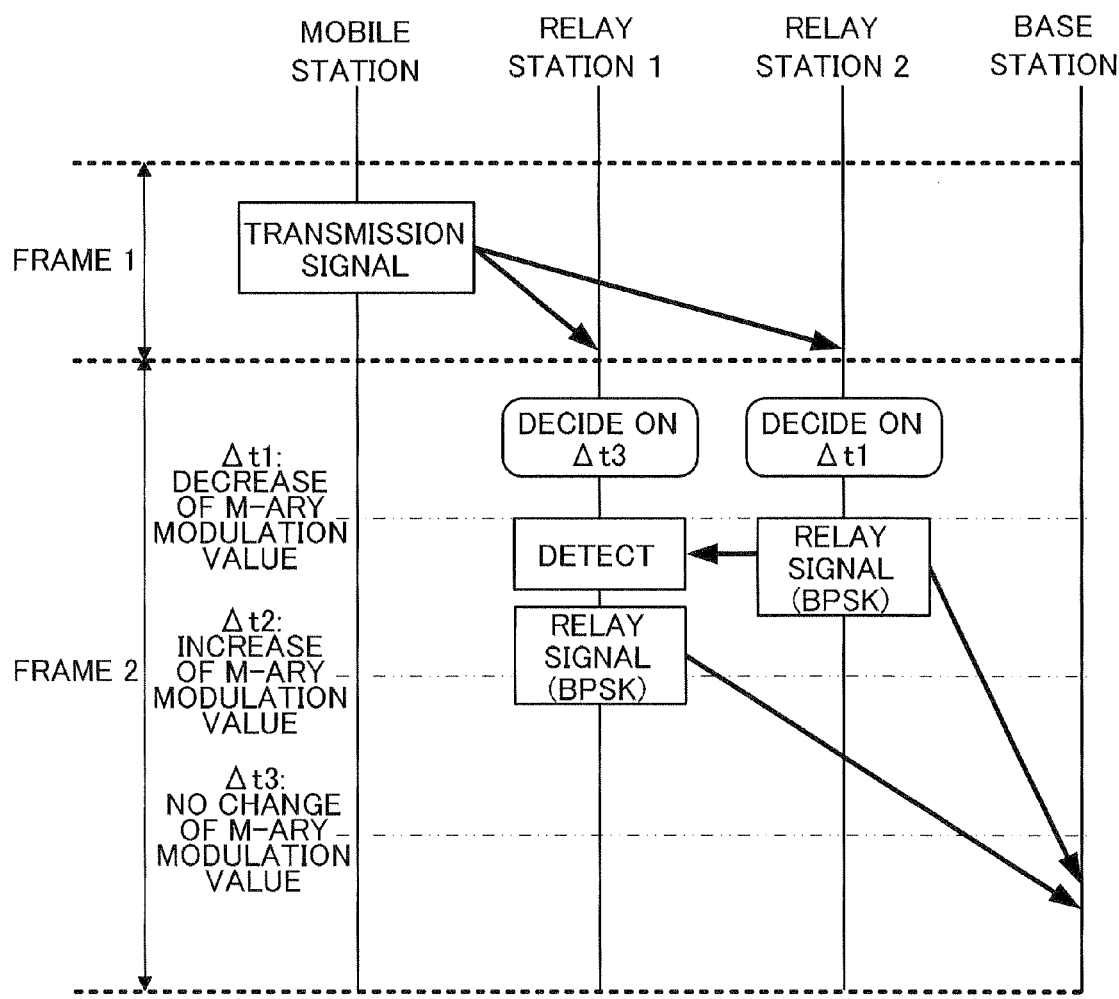
FIG. 10 is a look-up table according to embodiment 2.
FIG. 11 is a sequence diagram according to embodiment 2.

First, the operation of the mobile communication system according to the present embodiment will be described. In the present embodiment, setting of the amount of delay at the relay station and estimation of the MCS parameter are carried out using <table example 3> shown in FIG. 8 or <table example 4> shown in FIG. 10, as will be described in the following text. In these tables, the amounts of delay are $\Delta t1 < \Delta t2 < \Delta t3$. Also, similar to embodiment 1, relay station 1 and relay station 2 are provided with the same table as shown in FIG. 8 or FIG. 10. Relay station 1 and relay station 2 receive the same signal from the mobile station at the same time. It is assumed that the modulation scheme to be used in the present embodiment is one of 64 QAM, 16 QAM, 8 PSK, QPSK and BPSK.

Table Example 3

In table example 3 (FIG. 8), an increase in the M-ary modulation level is set with respect to a smaller amount of delay ($\Delta t1$) and a decrease in the M-ary modulation level is set with respect to a greater amount of delay ($\Delta t2$). Also, the M-ary modulation level is maintained in with respect to a greater amount of delay ($\Delta t3$) than the amounts of delay ($\Delta t1$ and $\Delta t2$) according an increase or decrease in the M-ary modulation level.

First, each relay station sets the MCS parameter in accordance with the channel quality between the relay station and the base station. Then, each relay station decides the amount of delay in according to one of an increase, decrease or no change (maintenance) in the M-ary modulation level of the modulation scheme whose MCS parameter is set at present, with respect to the M-ary modulation level of the modulation scheme whose MCS parameter was set previously. To be more specific, the relay station decides that the amount of delay for the relay station is $\Delta t1$ if the M-ary modulation level increases, the amount of delay for the relay signal is $\Delta t2$ if the M-ary modulation level decreases, and the amount of delay for the relay signal is $\Delta t3$ when the M-ary modulation level does not change. In other words, each relay station decreases the amount of delay if the M-ary modulation level increases, and increases the amount of delay when the M-ary modulation level decreases. Then, each relay station delays the signal received from the mobile station by the decided amount of delay, and relays and transmits the resulting signal.

Also, the relay station determines whether the other relay station transmits the relay signal of a smaller amount of delay than the amount of delay at the relay station. If the relay station detects, by the delay period at the relay station, that the other relay station relayed and transmitted the same relay signal to the base station, it estimates the MCS parameter used by the other relay station in the relay signal, from the amount of delay imposed on the relay signal by the other relay station. For instance, if the relay station detects that the other relay station carried out relay-transmission by amount of delay $\Delta t1$, the relation station estimates that the MCS parameter used by the other relay station is a MCS parameter whose M-ary modulation level is raised by one level form the previous MCS parameter. Then, the relay station modulates the relay signal using the estimated MCS parameter and transmits the resulting signal. Thus, if there is another relay station that has performed relay-transmission to the base station earlier a relay station, the latter relay station adjusts the modulation scheme of the relay signal at the relay station to the modulation scheme of the relay signal at that another relay station, thereby making it possible to perform relay-transmission using the same modulation scheme.

On the other hand, if a relay station does not detect, by the delay period at the relay station, that another relay station performed relay-transmission to the base station, the relay station modulates the relay signal using the MCS parameter set in accordance with the channel quality between the relay station and the base station, and transmits this relay signal with an amount of delay in accordance with that MCS parameter.

Next, FIG. 9 shows a sequence diagram illustrating a case where, in table example 3, both relay station 1 and relay station 2 used QPSK at the previous time, while 8 PSK is set for relay station 1 and QPSK is set for relay station 2 at present (i.e., a case where the M-ary modulation level of relay station 1 is greater than the previous time and the M-ary modulation level of relay station 2 is the same as the previous time and does not change).

In frame 1, the mobile station transmits the transmission signal for the base station, to relay station 1 and relay station 2.

In frame 2, since the modulation scheme set at present is 8 PSK and its M-ary modulation level is increased compared to that of QPSK used previously, base station 1 decides the amount of delay to be $\Delta t1$, with reference to the table in FIG. 8. Also, since the modulation scheme set at present is QPSK and its M-ary modulation level is the same as that of QPSK used previously, relay station 2 decides the delay period to be $\Delta t3$, with reference to the table of FIG. 8. Then, relay station 1 transmits the relay signal whose modulation scheme is 8 PSK, to the base station, with amount of delay $\Delta t1$ of frame 2. On the other hand, relay station 2 detects, by t3, whether relay station 1 transmitted the relay signal with amount of delay $\Delta t1$. If the detection result is affirmative, relay station 2 estimates, from the fact that the relay signal from relay station 1 is transmitted with amount of delay $\Delta t1$, that the modulation scheme used by relay station 1 is a modulation scheme whose M-ary modulation level is raised by one level, compared to the modulation scheme used previously (i.e., 8 PSK), with reference to the table in FIG. 2. Then, relay station 2 updates QPSK, which is the modulation scheme initially set, to 8 PSK, which is the same modulation scheme as that of relay station 1, then modulates the relay signal using 8 PSK and transmits the modulated signal to the base station. Also, as soon as a relay signal from relay station 1 is detected, relay station 2 cancels the delay at relay station 2 and immediately transmits the relay signal. Thus, the relay signal from relay station 2 is transmitted at an earlier timing than the amount of delay Δt3 that was initially decided. Then, the base station receives the relay signal from relay station 1 and the relay signal from relay station 2 and combines both relay signals.

In this way, according to table example 3, the MCS parameter for a relay station where channel quality varies significantly cannot be changed in accordance with a relay station where the MCS parameter does not vary, in order to prevent the situation where the MCS parameter in the mobile communication system is always constant, the amounts of delay (Δt1 and Δt2) for when the M-ary modulation level varies are set smaller than the delay amount (Δt3) for when the M-ary modulation level does not vary, and, if the MCS parameter changes one relay stations, each relay station updates the MCS parameter to match with that change. Also, in table example 3, similar to the above-mentioned table example 1 (FIG. 2), since the modulation scheme of a relay station is adjusted to the modulation scheme at a relay station where a channel quality is higher (i.e., the M-ary modulation level is greater), the transmission rate of the relay signal can be improved.

Table Example 4

Table example 4 (FIG. 10) differs from table example 3 (FIG. 8) in providing a decrease of the M-ary modulation level with respect to a smaller amount of delay (Δt1) and an increase of the M-ary modulation level with respect to a greater amount of delay (Δt2).

Since the use of such a table makes it possible to adjust the modulation scheme of another relay station to the modulation scheme at the relay station where the channel quality is lower (i.e., the M-ary modulation level is smaller), similar to the above-described table example 2 (FIG. 4), relay signals from a plurality of relay stations can be reliably received at the base station.

Next, FIG. 11 shows a sequence diagram illustrating a case where, in table example 4, both relay station 1 and relay station 2 used QPSK at the previous time, while QPSK is set in relay station 1 and BPSK is set in relay station 2 at present (i.e., a case where the M-ary modulation level of relay station 1 is the same as the previous time and does not change and the M-ary modulation level of relay station 2 is smaller than at the previous time).

In frame 1, the mobile station transmits the transmission signal for the base station, to relay station 1 and relay station 2.

In frame 2, since the modulation scheme set at present is QPSK and its M-ary modulation level is the same as that of QPSK used previously, base station 1 decides the amount of delay to be Δt3 with reference to the table in FIG. 10. Also, since the modulation scheme set at present is BPSK and its M-ary modulation level is smaller than that of QPSK used previously, relay station 2 decides the delay period to be Δt1 with reference to the table of FIG. 10. Then, relay station 2 transmits the relay signal whose modulation scheme is BPSK, to the base station, with amount of delay Δt1 of frame 2. On the other hand, relay station 1 detects, by Δt3, whether relay station 2 transmitted the relay signal with amount of delay Δt1. If the detection result is affirmative, relay station 1 estimates, from the fact that the relay signal from relay station 2 is transmitted with amount of delay Δt1, that the modulation scheme used by relay station 2 is a modulation scheme whose M-ary modulation level is lowered by one level, compared to that of the modulation scheme used previously (i.e., BPSK), with reference to the table in FIG. 10. Then, relay station 1 updates the QPSK modulation scheme initially set, to BPSK, which is the same modulation scheme as that of relay station 1, then modulates the relay signal using BPSK, and transmits the modulated signal to the base station. Also, as soon as a relay signal from relay station 2 is detected, relay station 1 cancels the delay at relay station 1 and immediately transmits the relay signal. Thus, the relay signal from relay station 1 is transmitted at an earlier timing than the amount of delay Δt3 which was initially decided. Then, the base station receives the relay signal from relay station 1 and the relay signal from relay station 2 and combines both relay signals.

As described above, since relay-transmission is carried out using a modulation scheme of a smaller M-ary modulation level as in table example 4, in contrast to using a modulation scheme of a greater M-ary modulation level as in table example 3, the relay signals from a plurality of relay stations can be reliably received at the base station.

Figure 12:
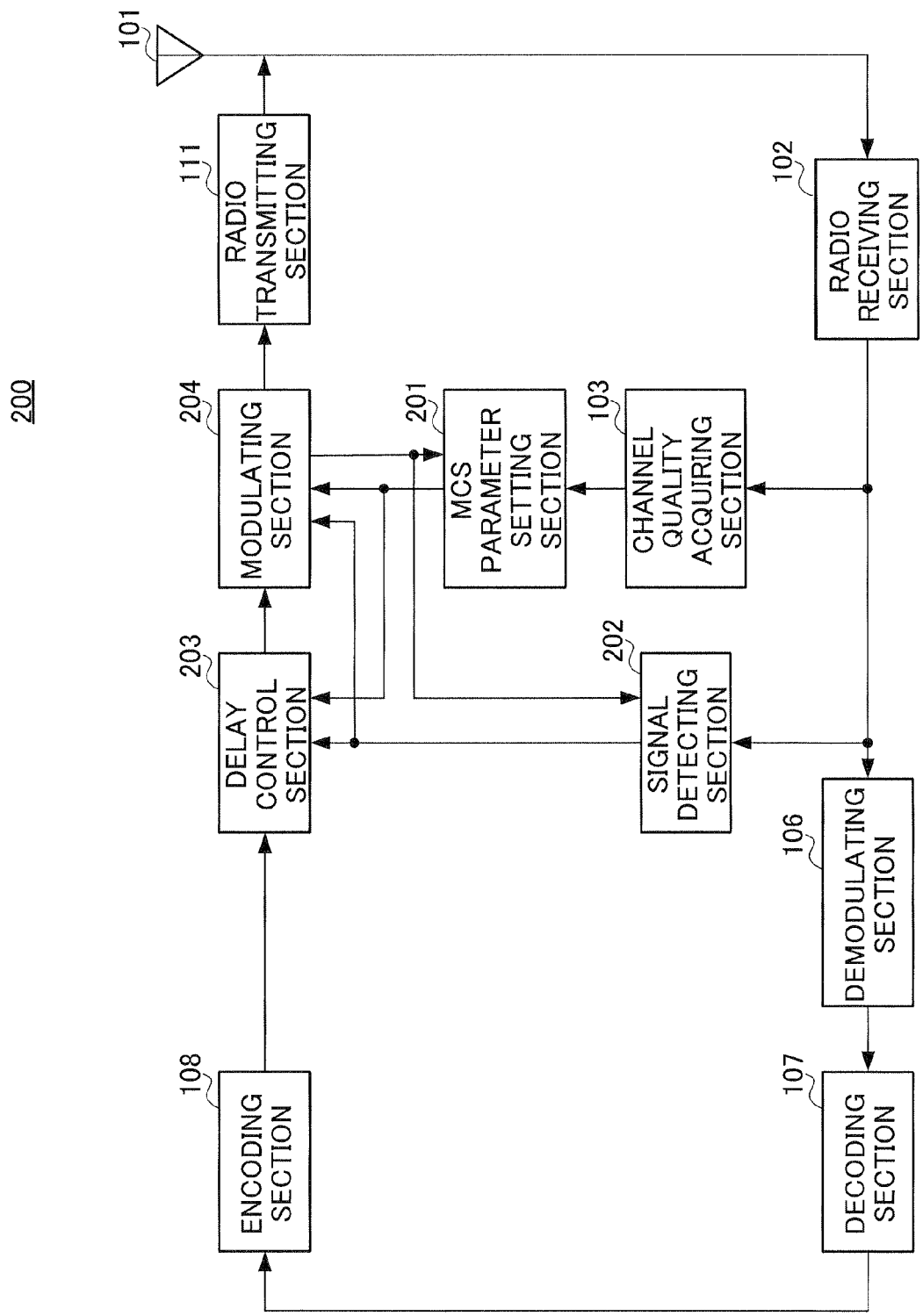
FIG. 12 is a block diagram showing the configuration of a relay station according to embodiment 2.

Next, the configuration of a relay station according to the present embodiment will be described. The configuration of relay station 200 according to the present embodiment is shown in FIG. 12. Components in FIG. 12 which are the same as in embodiment 1 (FIG. 6) will be designated by the same numeric symbols and further descriptions thereof will be hereby omitted.

MCS parameter setting section 201 sets the MCS parameter of the relay signal based on channel quality, and sets the parameter in modulating section 204. MCS parameter setting section 201 holds the previously obtained channel quality and the MCS parameter used by modulating section 204 in the transmission of a previous relay signal, to determine to what extent the channel quality acquired this time has varied with respect to the channel quality acquired previously. Then, MCS parameter setting section 201 sets the MCS parameter in which the M-ary modulation level is raised by one level, if the amount of variation is equal to or above a predetermined value, the MCS parameter in which the M-ary modulation level is lowered by one level, if the variation becomes lower than a predetermined value, or the MCS parameter used at the time of the previous relay signal transmission, if the variation amount is within a predetermined range, in modulating section 204. Also, MCS parameter setting section 201 reports one of an increase, decrease or no change in the M-ary modulation level to delay control section 203.

Signal detecting section 202 determines whether the other relay station has already performed relay-transmission, by comparing the signal from the mobile station to the relay signal from the other relay station. In other words, if the signal from the mobile station is the same as the relay signal from the other mobile station, signal detecting section 202 determines that the same relay signal has already been transmitted from the other relay station to the base station, and detects that the other relay station has already performed relay-transmission. If the result of the detection is affirmative, this information is inputted to delay control section 203 and modulating section 204.

Also, if signal detecting section 202 detects that the other relay station has already performed relay-transmission, it estimates the amount of delay for the relay signal at the other relay station. If the signal from the mobile station is the same as the relay signal from the other relay station, signal detecting section 202 estimates the difference between the timing the signal from the mobile station is inputted (i.e., the reception timing of the signal from the mobile station, at relay station 200) and the timing the relay signal from the other relay station is inputted (i.e., the reception timing of the relay signal from the other relay station, at relay station 200), as the amount of delay at the other relay station. In other words, signal detecting section 202 estimates the input delay difference (reception delay difference) of the relay signal from the other relay station, with respect to the signal from the mobile station, as the amount of delay at the other relay station. Also, signal detecting section 202 holds the MCS parameter used by modulating section 204 in a previous transmission of the relay signal, and is provided with the table shown in FIG. 8 or FIG. 10, and estimates the MCS parameter used by the other relay station, from the estimated amount of delay, with reference to this table. Then, signal detecting section 202 inputs the estimation results for the MCS parameter to modulating section 204.

The signal from the mobile station which is outputted from radio receiving section 102 is demodulated at demodulating section 106, and, after being decoded by decoding section 107, the decoded signal is encoded again by encoding section 108, and the result is inputted to delay control section 203.

Delay control section 203 is provided with the table shown in FIG. 8 or FIG. 10, and decides the amount of delay in accordance with one of an increase, decrease or no change in the M-ary modulation level reported from MCS parameter setting section 102 with reference to this table.

Then, if signal detecting section 202 does not detect, during a period of time from the head of the frame of the relay signal until the delay period passes, that the other relay station has performed relay-transmission to the base station, delay control section 203 delays the relay signal by the decided amount of delay, and outputs the delayed relay signal to modulating section 204.

On the other hand, if signal detecting section 202 detects, during a period of time from the head of the frame of the relay signal until the delay period passes, that the other relay station has performed relay-transmission to the base station, delay control section 203 cancels the delay processing at the timing the report of the above detection is inputted from signal detecting section 202, and immediately outputs the relay signal to modulating section 204. Thus, in this case, delay control section 203 outputs the relay signal to modulating section 204 at an earlier timing than the delay period initially decided.

If signal detecting section 202 does not detect that the other relay station has performed relay-transmission to the base station, modulating section 204 modulates the relay signal using a modulation scheme whose MCS parameter is set by MCS parameter setting section 201, and outputs the result to radio transmitting section 111.

On the other hand, if signal detecting section 202 detects that the other relay station has performed relay-transmission to the base station, modulating section 204 updates the MCS parameter set by MCS parameter setting section 201 by the MCS parameter estimated at signal detecting section 202, modulates the relay signal using a modulation scheme whose MCS parameter is updated, and outputs the modulated signal to radio transmitting section 111.

In either case, modulating section 204 outputs the MCS parameter used to modulate the relay signal to MCS parameter setting section 201 and signal detecting section 202, and the MCS parameter outputted from modulating section 204 is held at MCS parameter setting section 201 and signal detecting section 202. The MCS parameter held in MCS parameter setting section 201 and signal detecting section 202 is updated each time modulation of the relay signal is performed by modulating section 204.

In this way, similar to embodiment 1 (relay station 100), if relay station 200 detects that the other relay station has performed relay-transmission earlier than relay station 200, it adjusts the modulation scheme of the relay signal at the relay station 200 to the modulation scheme of the relay signal at the other relay station, and transmits the relay signal.

Next, the operation flow of the delay process and the modulation process at relay station 200 will be described using again the flow chart of FIG. 7. Since the processes after ST202 are the same as those in embodiment 1, descriptions thereof will be hereby omitted.

In ST202, amount of delay $\Delta tN$ is decided in accordance with one of an increase, decrease or no change in the M-ary modulation level of the MCS parameter, based on the table shown in FIG. 8 or FIG. 10.

Thus, similar to embodiment 1, according to the present embodiment, each relay station estimates the MCS parameter of the other relay station based on the delay period of the relay signal, so that, even when individual relay stations need to transmit relay signals using the same MCS parameter, reporting of the MCS parameter from the base station or mobile stations to the relay station or reporting of the MCS parameter between relay stations is not necessary, thereby making it possible to reduce the amount of signaling necessitated by relay-transmission and improve throughput.

In the above-described embodiments, there may be 3 or more relay stations.

Also, the relay station may perform the same operation at the time of receiving a retransmission request signal in frame 1.

Also, another frame may be introduced between frame 1 and frame 2.

Channel quality may be measured using SIR, SNR, SINR, CIR, CNR, CINR, RSSI, reception intensity, receive power, interference power, error rate, transmission rate, throughput, interference amount, or MCS and soon at which a predetermined error rate can be reached. Also, channel quality may be indicated by, for example, "CQI" (Channel Quality Indicator) or "CSI" (Channel State Information).

The look-up tables showing the correspondence between modulation schemes and amounts of delay (FIGS. 2, 4, 8 and 10) may be updated by commands from the base station, mobile station on a higher control station, or by exchanging information between the relay stations, or the relay station may update the table on its own. Updating may be carried out for each transmission or at regular intervals, or may be carried out conveniently during communication.

Also, the amount of delay at any one relay station from a plurality of relay stations may be varied, and the other relay stations may estimate the MCS parameter from this amount of delay.

Each relay station may set the MCS parameter in conjunction with the channel quality between the other relay station and the base station.

Also, in FIG. 6 and FIG. 12, the modulating section (110 and 204) may be provided before the delay control section (109 and 203), in which case, the modulating section generates modulation signals for all MCS parameters and inputs these signals to delay control section, whereas the delay control section selects a signal based on the information inputted from the signal detecting section (105 and 202) and information inputted from MCS parameter setting section (104 and 201), and inputs this signal to the radio transmitting section (111).

Also, the MCS parameter and the amount of delay may be changed for each frame or every several frames.

Also, the frame in which the MCS parameter is estimated from the amount of delay at the other relay station may differ from the frame in which relay-transmission is carried out using this estimated MCS parameter. In other words, the MCS parameter is not changed in the frame in which MCS parameter is estimated, but the MCS parameter is changed in the next frame.

In the above-described embodiments, the base station is sometimes designated as "Node B", and the mobile station, as "UE".

In the above-described embodiments, other relay stations may be present between the relay station and the base station, or between the mobile station and the relay station.

Also, in the above-described embodiments, an example is described of a case where the present invention is configured by hardware, however, the present invention can also be realized by software.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-100851, filed on Mar. 31, 2005, the entire content of which is expressly incorporated by reference herein.

INDUSTRIAL APPLICABILITY

The present invention can be applied to, for example, communication systems (for instance, multi-hop systems) where a wireless communication apparatus such as a mobile station, a base station and so on performs wireless communication via a relay station.

The invention claimed is:

1. A wireless communication apparatus that relays and transmits a relay signal to a second wireless communication apparatus, the relay signal being generated by demodulating a transmission signal from a first wireless communication apparatus and modulating the demodulated signal again, the wireless communication apparatus comprising:
an estimating section that estimates a modulation scheme used at a third wireless communication apparatus that relays and transmits the transmission signal to the second wireless communication apparatus, the modulation scheme being estimated from an amount of delay for a relay transmission performed by the third wireless communication apparatus;
a modulation section that modulates the relay signal using the estimated modulation scheme; and
a transmitting section that transmits the modulated relay signal to the second wireless communication apparatus.

2. The wireless communication apparatus according to claim 1, further comprising a table that provides a plurality of modulation schemes in association with a plurality of amounts of delay, respectively,
wherein the estimating section estimates the modulation scheme from the amount of delay with reference to the table.

3. The wireless communication apparatus according to claim 2, wherein the table provides a first modulation scheme of a greater M-ary modulation level with respect to a smaller amount of delay and a second modulation scheme of a smaller M-ary modulation level with respect to a greater amount of delay.

4. The wireless communication apparatus according to claim 2, wherein the table provides a first modulation scheme of a greater M-ary modulation level with respect to a greater amount of delay and a second modulation scheme of a smaller M-ary modulation level with respect to a smaller amount of delay.

5. The wireless communication apparatus according to claim 1, further comprising a table that provides an increase or decrease of an M-ary modulation level in association with a plurality of amounts of delay,
wherein the estimating section estimates the modulation scheme from the amount of delay with reference to the table.

6. The wireless communication apparatus according to claim 5, wherein the table provides the increase of the M-ary modulation level with respect to a smaller amount of delay and the decrease of the M-ary modulation level with respect to a greater amount of delay.

7. The wireless communication apparatus according to claim 5, wherein the table provides the decrease of the M-ary modulation level with respect to a smaller amount of delay and the increase of the M-ary modulation level with respect to a greater amount of delay.

8. The wireless communication apparatus according to claim 5, wherein, in addition to the increase or decrease of the M-ary modulation level, the M-ary modulation level is not changed for an amount of delay that is greater than the amounts of delay for the increase or and decrease of the M-ary modulation number.

9. The wireless communication apparatus according to claim 1, wherein, when the wireless communication apparatus detects that the third wireless communication apparatus has performed the relay transmission to the second wireless communication apparatus, the estimating section estimates the modulation scheme used at the third wireless communication apparatus.

10. The wireless communication apparatus according to claim 1, wherein, when the wireless communication apparatus does not detect that the third wireless communication apparatus has performed the relay transmission to the second wireless communication apparatus, the modulating section modulates the relay signal using a modulation scheme that is set in accordance with channel quality between the wireless communication apparatus and the second wireless communication apparatus.

11. The wireless communication apparatus according to claim 1, wherein, when the wireless communication apparatus detects that the third wireless communication apparatus has performed the relay transmission to the second wireless communication apparatus before a relay transmission by the wireless communication apparatus to the second wireless communication apparatus, the modulating section modulates the relay signal using a modulation scheme of the relay transmission by the third wireless communication apparatus.

12. A wireless communication method in a wireless communication apparatus that relays and transmits a relay signal to a second wireless communication apparatus, the relay signal being generated by demodulating a transmission signal from a first wireless communication apparatus and modulating the demodulated signal again, the wireless communication method comprising:

estimating a modulation scheme used at a third wireless communication apparatus that relays and transmits the transmission signal to the second wireless communication apparatus, the modulation scheme being estimated from an amount of delay for a relay transmission performed by the third wireless communication apparatus;

modulating the relay signal using the estimated modulation scheme; and transmitting the modulated relay signal to the second wireless communication apparatus.

* * * * *

UNITED STATES PATENT AND TRADEMARK OFFICE
CERTIFICATE OF CORRECTION

| | | |
|---|---|---|
| PATENT NO. | : 7,940,728 B2 | |
| APPLICATION NO. | : 11/909922 | |
| DATED | : May 10, 2011 | |
| INVENTOR(S) | : Ayako Horiuchi et al. | |

It is certified that error appears in the above-identified patent and that said Letters Patent is hereby corrected as shown below:

IN THE CLAIMS:

Column 16, line 39, claim 8, incorrectly reads:

"amounts of delay for the increase or and decrease of the M-ary"

and should read:

"amounts of delay for the increase or decrease of the M-ary"

Signed and Sealed this
Twenty-eighth Day of February, 2012

David J. Kappos
*Director of the United States Patent and Trademark Office*